US009372852B2

(12) United States Patent
Kim

(10) Patent No.: US 9,372,852 B2
(45) Date of Patent: Jun. 21, 2016

(54) DEVICE AND METHOD FOR CHANGING LIP SHAPES BASED ON AUTOMATIC WORD TRANSLATION

(71) Applicant: Sang Cheol Kim, Namyangju-si (KR)

(72) Inventor: Sang Cheol Kim, Namyangju-si (KR)

( * ) Notice: Subject to any disclaimer, the term of this patent is extended or adjusted under 35 U.S.C. 154(b) by 0 days.

(21) Appl. No.: 14/426,760

(22) PCT Filed: Sep. 5, 2013

(86) PCT No.: PCT/KR2013/008005
§ 371 (c)(1),
(2) Date: Mar. 9, 2015

(87) PCT Pub. No.: WO2014/046401
PCT Pub. Date: Mar. 27, 2014

(65) Prior Publication Data
US 2015/0242394 A1  Aug. 27, 2015

(30) Foreign Application Priority Data
Sep. 18, 2012 (KR) .................. 10-2012-0103135

(51) Int. Cl.
*G10L 21/10* (2013.01)
*G06F 17/28* (2006.01)
*G10L 15/00* (2013.01)
*G10L 15/25* (2013.01)
*G06K 9/00* (2006.01)

(52) U.S. Cl.
CPC .............. *G06F 17/28* (2013.01); *G10L 15/005* (2013.01); *G10L 15/25* (2013.01); *G10L 21/10* (2013.01); *G06K 9/00234* (2013.01); *G10L 2021/105* (2013.01)

(58) Field of Classification Search
USPC .......................... 704/231–257, 270, 275, 277
See application file for complete search history.

(56) References Cited

U.S. PATENT DOCUMENTS 6,112,177 A * 8/2000 Cosatto ................... G10L 13/00
704/260
6,766,299 B1 * 7/2004 Bellomo ................. G10L 21/06
704/235

(Continued)

FOREIGN PATENT DOCUMENTS

JP       11-231899 A    8/1999
JP       4011844 B2    11/2007

OTHER PUBLICATIONS

International Search Report for PCT/KR2013/008005 mailed Nov. 12, 2013 from Korean Intellectual Property Office.

(Continued)

*Primary Examiner* — Abul Azad
(74) *Attorney, Agent, or Firm* — Revolution IP, PLLC

(57) ABSTRACT

Disclosed are a device and method for changing lip shapes based on automatic word translation. When a user takes a video of his or her own face and inputs his or her voice through a microphone, the device and method for changing lip shapes based on automatic word translation separates an area in which the user's lips are located from a video taken by the camera; recognizes the user's voice; inserts a partial video to the area in which the user's lips are located, the partial video representing a lip shape for a word obtained when a specific word corresponding to the recognized voice is translated to a different language. Consequently, when the word input by the user's voice is translated to the different language, the lip shape may be automatically changed to accord with the language.

10 Claims, 2 Drawing Sheets

(56) References Cited

U.S. PATENT DOCUMENTS 6,813,607 B1 * 11/2004 Faruquie ................ G10L 21/06
                                                     704/258
7,145,606 B2 * 12/2006 Haisma ................ G06T 13/205
                                                     348/473
7,392,190 B1 *  6/2008 Cosatto ........................ 704/251

2007/0255570 A1 * 11/2007 Annaz ................... G09B 19/06
                                                     704/270
2008/0004879 A1 *  1/2008 Huang ................... G09B 19/06
                                                     704/270

OTHER PUBLICATIONS

Kim, Ki Baek et al., The Koreans Society of Broadcast Engineers, May 2012 See abstract, pp. 521-525.

* cited by examiner

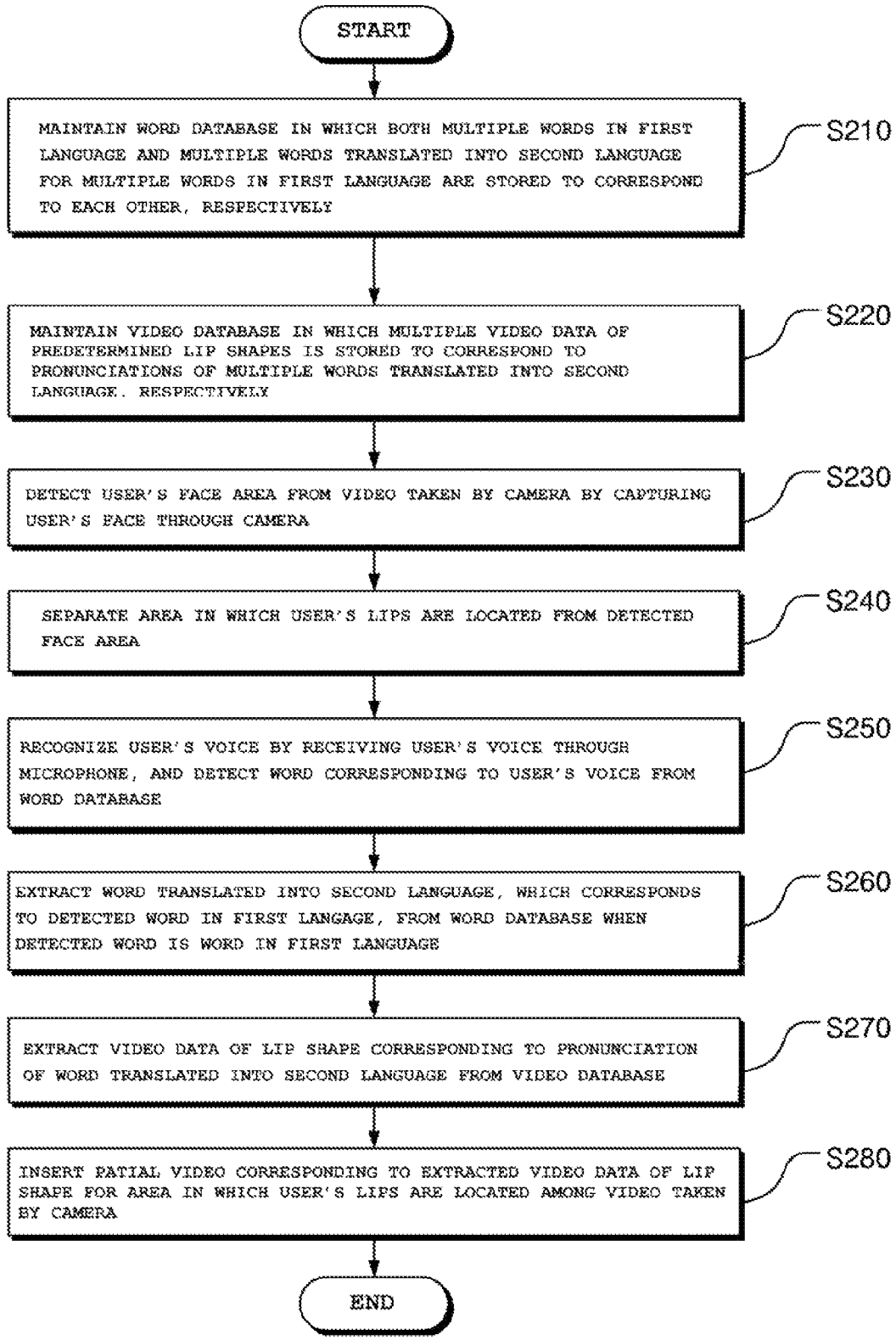

DEVICE AND METHOD FOR CHANGING LIP SHAPES BASED ON AUTOMATIC WORD TRANSLATION

CROSS REFERENCE TO PRIOR APPLICATIONS

This application is a National Stage Application of PCT International Patent Application No. PCT/KR2013/008005 filed on Sep. 5, 2013, under 35 U.S.C. §371, which claims priority to Korean Patent Application No. 10-2012-0103135 filed Sep. 18, 2012, which are all hereby incorporated by reference in their entirety.

TECHNICAL FIELD

Embodiments of the present invention relate to a technique for changing user's lip shapes in a face video to other lip shapes in accordance with a word in a different language when a word corresponding to the user's voice is translated into the different language after the user's face video is taken and the user's voice is recognized.

BACKGROUND ART

These days, with the advent of technology related to video-based communication such as videotelephony, video chatting, and the like, interest in video-based communication is increasing.

Comparing to existing voice-based communication, video-based communication may support accurate communication between a speaker and a receiver because not only the speaker's voice is output from a receiver's terminal device but also the speaker's face image is displayed on the receiver's terminal device.

Also, recently, international communication is increasing with the development of the Internet. In this case, when languages between two communication parties are different from each other, communication between the two parties may not progress smoothly.

To solve the above mentioned problem, a technique for recognizing a speaker's voice and automatically translating the recognized voice into another language has emerged.

However, if the video-based communication simply translates the speaker's voice into a different language but does not change the speaker's lip shape to accord with the translated language, the receiver may find it difficult to perfectly understand the speaker's intention.

Consequently, more research is required to change a speaker's lip shape to accord with the translated language while the speaker's voice is translated into the different language.

DISCLOSURE

Technical Problem

When a user takes a video of his or her own face using a camera and inputs his or her voice through a microphone, embodiments of the present invention separate an area in which the user's lips are located from a video taken by the camera; recognize the user's voice; insert a partial video for the area in which the user's lips are located, the partial video representing a lip shape for a word obtained when a specific word corresponding to the recognized voice is translated into a different language. Consequently, when the word input by the user's voice is translated into the different language, the embodiments of the present invention may automatically change the shape of user's lips to accord with the language.

Technical Solution

A device for changing lip shapes based on automatic word translation according to an embodiment of the present invention includes: a word database in which both multiple words in a first language and multiple words translated into a second language for the multiple words in the first language are stored to correspond to each other, respectively; a video database in which multiple video data of predetermined lip shapes is stored to correspond to pronunciations of the multiple words translated into the second language, respectively; an area detection unit for capturing a face of a user using a camera and for detecting a face area of the user from a video taken by the camera; an area separation unit for separating an area in which lips of the user are located from the detected face area; a word detection unit for receiving a voice of the user through a microphone, for recognizing the input voice of the user, and for detecting a word corresponding to the voice of the user from the word database; a translated word extraction unit for extracting a word translated into the second language, which corresponds to the detected word in the first language, from the word database when the detected word is a word in the first language; a video data extraction unit for extracting video data of lip shapes corresponding to a pronunciation of the extracted word in the second language from the video database; and a video insertion unit for inserting a partial video, which corresponds to the extracted video data of the lip shapes, for the separated area in which lips of the user are located among the video taken by the camera.

Also, a method for changing lip shapes based on automatic word translation according to an embodiment of the present invention includes: maintaining a word database in which both multiple words in a first language and multiple words translated into a second language for the multiple words in the first language are stored to correspond to each other, respectively; maintaining a video database in which multiple video data of predetermined lip shapes is stored to correspond to pronunciations of the multiple words translated into the second language, respectively; detecting a face area of a user from a video taken by a camera by capturing a face of the user using the camera; separating an area in which lips of the user are located from the detected face area; detecting a word corresponding to a voice of the user from the word database by receiving the voice of the user through a microphone and by recognizing the input voice of the user; extracting a word translated into the second language, which corresponds to the detected word in the first language, from the word database when the detected word is a word in the first language; extracting video data of lip shapes corresponding to a pronunciation of the extracted word in the second language from the video database; and inserting a partial video, which corresponds to the extracted video data of the lip shapes, for the separated area in which lips of the user are located among the video taken by the camera.

Advantageous Effects

When a user takes a video of his or her own face using a camera and inputs his or her voice through a microphone, embodiments of the present invention separate an area in which the user's lips are located from a video taken by the camera; recognize the user's voice; insert a partial video for the area in which the user's lips are located, the partial video representing a lip shape for a word obtained when a specific word corresponding to the recognized voice is translated into a different language. Consequently, when the word input by the user's voice is translated into the different language, the embodiments of the present invention may automatically change the user's lip shape to accord with the language.

DESCRIPTION OF DRAWINGS

FIG. 2 is a flow diagram illustrating a method for changing lip shapes based on automatic word translation, according to an embodiment of the present invention.

BEST MODE

Figure 1:
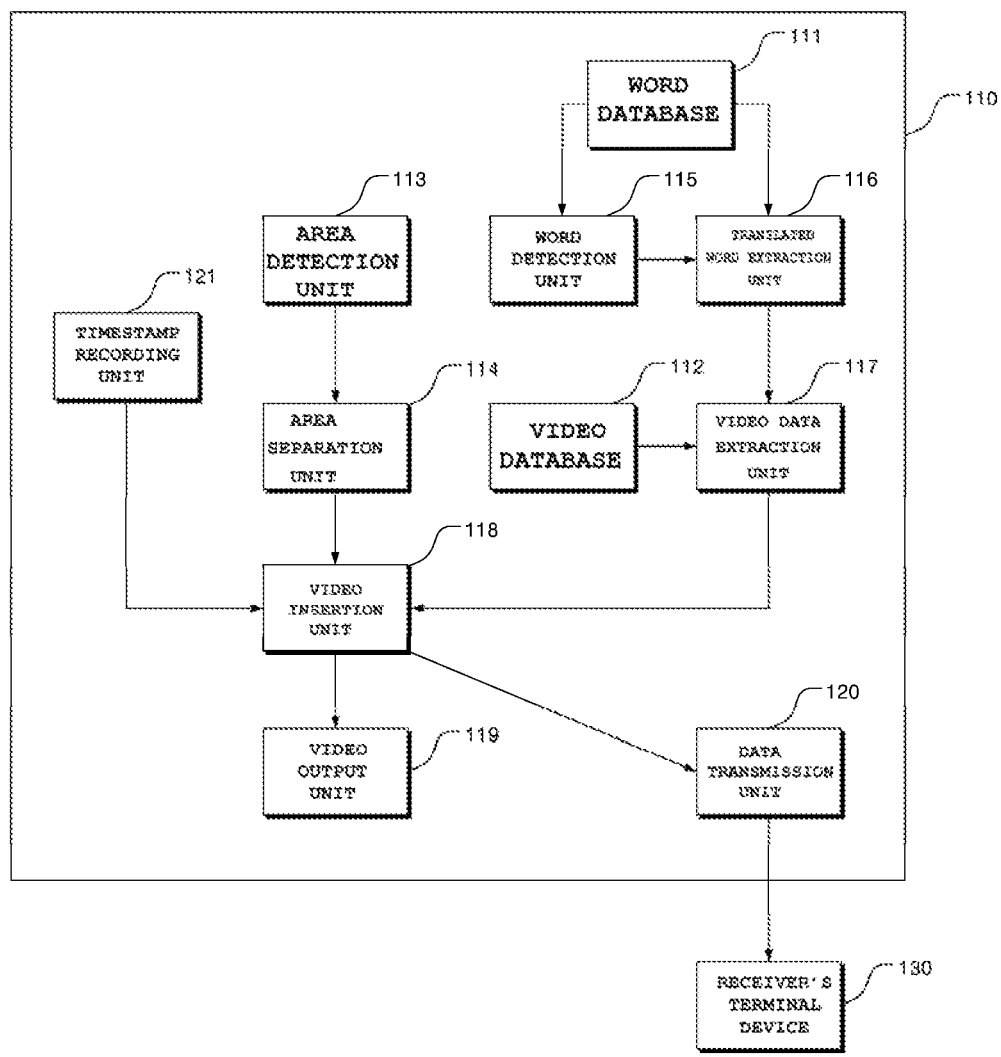
FIG. 1 is a view illustrating a structure of a device for changing lip shapes based on automatic word translation, according to an embodiment of the present invention.

The present invention will now be described in detail based on aspects or embodiments. The present invention may, however, be embodied in many different forms and should not be construed as being limited to only the embodiments set forth herein, but should be construed as covering modifications, equivalents or alternatives falling within ideas and technical scopes of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular aspects or embodiments only and is not intended to be limiting of the present invention. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Hereinafter, embodiments of the present invention will be described in detail referring to the accompanying drawings.

FIG. 1 is a view illustrating a structure of a device for changing lip shapes based on automatic word translation, according to an embodiment of the present invention.

Referring to FIG. 1, a device 110 for changing lip shapes based on automatic word translation according to an embodiment of the present invention includes a word database 111, a video database 112, an area detection unit 113, an area separation unit 114, a word detection unit 115, a video data extraction unit 117, and a video insertion unit 118.

Here, the device 110 for changing lip shapes based on automatic word translation may be implemented based on a microprocessor-based device such as a desktop PC, a mobile terminal, a PDA, a laptop, a tablet PC, and the like, in which both a camera for taking a video of a user and a microphone for receiving a user's voice are embedded, or from which the camera and the microphone are detachable.

The word database 111 stores multiple words in a first language and multiple words translated from the first language into a second language, to correspond to each other, respectively.

For example, when the first language is Korean and the second language is English, the word database 111 may store multiple words in Korean and multiple words obtained by translating each of the multiple words in Korean into English, so that the multiple words in Korean correspond to the multiple words in English, respectively, as is illustrated in the following Table 1.

TABLE 1

| Multiple words in Korean (first language) | Multiple words in English (second language) |
| --- | --- |
| 안녕하세요 | Hello |
| 이름 | Name |
| 날씨 | Weather |
| ... | ... |

The video database 112 stores multiple video data of predetermined lip shapes that respectively correspond to pronunciations of the multiple words translated into the second language.

For example, when the second language is English, the video database 112 may store previously produced video data of a lip shape corresponding to a pronunciation of a word 'Hello' among the multiple words translated into English.

Under the condition of that data is stored in the word database 111 and the video database 112 as described above, when a user takes a video of his or her own face using a camera of the device 110 for changing lip shapes based on automatic word translation in order to perform videotelephony or video chatting, the area detection unit 113 captures the user's face through the camera and detects the user's face area from the video taken by the camera.

In this case, according to an embodiment of the present invention, the area detection unit 113 may detect the user's face area from the video taken by the camera, based on colors of multiple pixels forming the video.

More specifically, the area detection unit 113 may detect the user's face area by separating pixels having colors included in a first color range from the multiple pixels forming the video taken by the camera, the first color range being predetermined by associating colors with a skin color of a face.

Operations of the area detection unit 113 will be described in detail as follows.

First, the area detection unit 113 may have the first color range, which has been predetermined by associating colors with a skin color of a face. For example, a color range from yellow to orange may be set as the first color range in the area detection unit 113.

In this case, when the user's face is captured by the camera, the area detection unit 113 excludes a background from the video taken by the camera, and may check colors of multiple pixels forming the video to detect the user's face area.

Subsequently, the area detection unit 113 separates pixels of which the color is included in the first color range, which corresponds to the color range from yellow to orange, from the multiple pixels forming the video taken by the camera. Then, the area detection unit 113 may detect the area composed of the separated pixels as the user's face area.

In other words, as humans have characteristic facial skin colors, the area detection unit 113 may detect the user's face area from the video taken by the camera, by separating the pixels having colors corresponding to the skin colors from the video.

When the area detection unit 113 completes the detection of the user's face area, the area separation unit 114 separates an area in which the user's lips are located from the detected face area.

In this case, according to an embodiment of the present invention, based on colors of multiple pixels forming a video corresponding to the detected face area, the area separation unit 114 may separate the area in which the user's lips are located.

The area separation unit 114 may separate the area in which the user's lips are located by separating pixels having colors included in a second color range from the multiple pixels forming the video corresponding to the detected face area, the second color range being predetermined by associating colors with a lip color.

Operations of the area separation unit 114 will be described in detail as follows.

First, the area separation unit 114 may have the second color range, which has been predetermined by associating colors with a lip color. For example, a color range from pink to red may be set as the second color range in the area separation unit 114.

In this case, when the detection of the user's face area is completed by the area detection unit 113, the area separation unit 114 may check colors of the multiple pixels forming the video corresponding to the detected face area in order to separate the area in which the user's lips are located from the detected face area.

Subsequently, the area separation unit 114 separates pixels of which the color is included in the second color range, which corresponds to the color range from pink to red, from the multiple pixels forming the video corresponding to the detected face area. Then, the area separation unit 114 may recognize the area composed of the separated pixels as the area in which the user's lips are located.

In other words, as human lips have characteristic colors distinguishable from a skin color, the area separation unit 114 may separate the area in which the user's lips are located from the detected face area by separating pixels having the color corresponding to the lip color from the detected face area.

While a user is performing videotelephony or video chatting, when his or her face is captured by a camera as described above and at the same time his or her voice is input through a microphone of the device 110 for changing lip shapes based on automatic word translation, the word detection unit 115 receives the user's voice through the microphone, recognizes the voice input by the user, and detects a word corresponding to the recognized user's voice.

For example, when the user inputs a word "안녕하세요" through the microphone, the word detection unit 115 recognizes the user's voice and may detect a word "안녕하세요", which corresponds to the recognized user's voice.

When the detected word is a word in the first language, a translated word extraction unit 116 may extract a word translated into the second language, which corresponds to the detected word in the first language, from the word database 111.

For example, when the word database 111 stores data such as Table 1, and when a Korean word "안녕하세요" is detected by the word detection unit 115, the translated word extraction unit 116 may extract a word "Hello" from the word database 111, the word "Hello" being a word translated into English to correspond to the Korean word "안녕하세요".

When the translated word extraction unit 116 has extracted the word translated into the second language, the video data extraction unit 117 extracts video data of a lip shape, which corresponds to a pronunciation of the extracted word in the second language, from the video database 112.

For example, when the translated word extraction unit 116 extracts a word "Hello" that has been translated into English, the video data extraction unit 117 may extract video data of a lip shape, which has been stored to correspond to the word "Hello", from the video database 112.

When the video data extraction unit 117 completes the extraction of the video data of the lip shape, the video insertion unit 118 inserts a partial video corresponding to the extracted video data of the lip shape in the video taken by the camera, targeting at the area in which the user's lips are located.

In summary, when a user takes a video of his or her own face using a camera and inputs his or her voice through a microphone, the device 110 for changing lip shapes based on automatic word translation according to an embodiment of the present invention separates an area in which the user's lips are located from a video taken by the camera; recognizes the user's voice; inserts a partial video for the area in which the user's lips are located, the partial video representing a lip shape for a word obtained when a specific word corresponding to the recognized voice is translated to a different language. Consequently, when the word input by the user's voice is translated to the different language, the lip shape may be automatically changed to accord with the language.

According to an embodiment of the present invention, the device 110 for changing lip shapes based on automatic word translation may further include a timestamp recording unit 121.

For video data composing the video taken by the camera and for voice data composing the voice input through the microphone, the timestamp recording unit 121 records at least one timestamp at predetermined time intervals, the timestamp being related to time synchronization between the time when the user's face is captured by the camera and the time when the user's voice is input through the microphone.

For example, when a user's face is captured by the camera from 0 to 30 seconds and at the same time the user's voice input through the microphone, the timestamp recording unit 121 may record at least one timestamp, which is related to time synchronization between the time when the video is taken and the time when the voice is input, for the video data and voice data from 0 to 30 seconds at the predetermined time intervals.

If the predetermined time interval is 5 seconds, the timestamp recording unit 121 may record the timestamp related to the time synchronization for each of the video data and voice data from 0 to 30 seconds at intervals of 5 seconds.

In this case, referring to at least one timestamp, the video insertion unit 118 may insert the partial video for the video data that corresponds to the time when the recognized voice is input among the video data composing the video taken by the camera.

In other words, the device 110 for changing lip shapes based on automatic word translation according to an embodiment of the present invention makes the timestamp recording unit 121 record at least one timestamp related to the time synchronization between the video data and voice data, whereby the video insertion unit 118 may insert the video of the lip shape, which corresponds to the word translated from the word input by the user's voice, in the video taken by the camera at the proper time.

According to an embodiment of the present invention, the device 110 for changing lip shapes based on automatic word translation may further include a video output unit 119.

When the insertion of the partial video into the video taken by the camera is completed, the video output unit 119 outputs a final video in which the partial video has been inserted.

Accordingly, the user may watch the final video in which his or her lip shape is changed to accord with the translated word.

Also, according to an embodiment of the present invention, the device 110 for changing lip shapes based on automatic word translation may further include a data transmission unit 120.

When the insertion of the partial video into the video taken by the camera is completed, the data transmission unit 120 transmits, to a receiver's terminal device 130, the video data of the final video in which the partial video has been inserted.

In other words, when a user performs videotelephony or video chatting with another person using the device 110 for changing lip shapes based on automatic word translation, the data transmission unit 120 may facilitate the videotelephony or video chatting by transmitting the final video in which the user's lip shape has been changed to the receiver's terminal device 130.

FIG. 2 is a flow diagram illustrating a method for changing lip shapes based on automatic word translation according to an embodiment of the present invention.

At step S210, a word database is maintained to store both multiple words in a first language and multiple words translated from the first language into a second language, to correspond to each other, respectively.

At step S220, a video database is maintained to store multiple video data of predetermined lip shapes corresponding to pronunciations of the multiple words translated into the second language.

At step S230, a video of a user's face is taken using the camera, and the user's face area is detected from the video taken by the camera.

At step S240, an area in which the user's lips are located is separated from the detected face area.

In this case, according to an embodiment of the present invention, based on colors of multiple pixels forming the video taken by the camera, the user's face area may be detected from the video taken by the camera at step S230. Also, based on colors of multiple pixels forming the video corresponding to the detected face area, the area in which the user's lips are located may be separated at step S240.

In this case, according to an embodiment of the present invention, the user's face area may be detected by separating pixels having colors included in a first color range, which has been predetermined by associating colors with a skin color of a face, from the multiple pixels forming the video taken by the camera at step S230. Also, the area in which the user's lips are located may be separated by separating pixels having colors included in a second color range, which has been predetermined by associating colors with a lip color, from the multiple pixels forming the video corresponding to the detected face area at step S240.

At step S250, a voice of the user is input through a microphone, the user's voice is recognized, and a word corresponding to the recognized user's voice is detected from the word database.

At step S260, when the detected word is a word in the first language, a word translated into the second language, which corresponds to the detected word in the first language, is extracted from the word database.

At step S270, video data of a lip shape that corresponds to a pronunciation for the extracted word in the second language is extracted from the video database.

At step S280, the partial video corresponding to the extracted video data of the lip shapes is inserted for the area in which the user's lips are located among the video taken by the camera.

In this case, according to an embodiment of the present invention, the method for changing lip shapes based on automatic word translation may further include a step for recording at least one timestamp after step S250. For video data composing the video taken by the camera and for voice data composing the voice input through the microphone, the step for recording at least one timestamp records a timestamp related to time synchronization between the time when the user's face is captured by the camera and the time when the user's voice is input through the microphone, at predetermined time intervals.

In this case, referring to at least one timestamp, the partial video may be inserted for the video data corresponding to the time when the recognized voice is input, among video data composing the video taken by the camera at step S280.

Also, according to an embodiment of the present invention, the method for changing lip shapes based on automatic word translation may further include a step for outputting a final video in which the partial video has been inserted when the insertion of the partial video in the video taken by the camera is completed after the step S280.

Also, according to an embodiment of the present invention, the method for changing lip shapes based on automatic word translation may further include a step for transmitting the video data of the final video in which the partial video has been inserted to the receiver's terminal device when the insertion of the partial video in the video taken by the camera is completed after the step S280.

Hereby, the method for changing lip shapes based on automatic word translation according to an embodiment of the present invention has been described referring to FIG. 2. The method for changing lip shapes based on automatic word translation according to an embodiment of the present invention may correspond to the operations of the device 110 for changing lip shapes based on automatic word translation, which has been described referring to FIG. 1. Consequently, the details are omitted.

The method for changing lip shapes based on automatic word translation according to an embodiment of the present invention may be implemented as a program that can be executed by various computer means, and the program may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

Although the present invention has been described above in connection with specific items, such as detailed elements, a limited embodiment, and the drawings, they are provided to help the general understanding of the present invention and the present invention is not limited to the above embodiments. Those skilled in the art can modify the present invention in various ways from the above description.

Accordingly, the scope of the present invention should not be limited to the above described embodiments, but should be defined within the scope of the appended claims and equivalent thereof.

The invention claimed is:

1. An apparatus for providing video and audio based communication by changing lip shapes of a communicator during a voice of the communicator is translated into a different language, the apparatus comprising:
   at least one or more unit being configured and executed by a processor using instructions and at least one non-transitory device comprising computer executable program, the at least one or more units comprising,
   a word database configured to store a plurality of first words of a first language and a plurality of second words correspondingly translated into a second language with respect to one of the first words;
   a video database configured to store video data associated with lip shapes corresponding to pronunciations of respective one of the second words translated into the second language, the video data comprising a plurality of lip shapes corresponding to pronunciation of each of the second words;
   an area detection unit configured to detect a face area of the communicator from a video taken by the camera and to capture a face of the communicator using a camera;
   an area separation unit configured to determine an area corresponding to the lip shapes to separate the area apart from the detected face area;
   a word detection unit configured to receive a voice of the communicator through a microphone, and to determine a word from the first words, the word being determined corresponding to the received voice;
   a translated word extraction unit configured to extract a word from the second words, the extracted word being translated into the second language corresponding to the received voice, the extracted word being a word in the second language;
   a video data extraction unit configured to determine and to extract a lip shape from the a plurality of lip shapes of the video data, the extracted lip shape corresponding to a pronunciation of the extracted word; and
   a video insertion unit configured to insert the extracted lip shape into the separated area at an interval based on timestamp during video and audio communications.

2. The device of claim 1, further comprising:
   a video output unit configured to output video and audio based communication signal by changing lip shapes of a communicator at an interval based on timestamp during a voice of the communicator is translated into a different language.

3. The device of claim 1, wherein the detection of a face area of the communicator from a video taken by the camera is performed based on determining colors of multiple pixels forming the video taken by the camera, and the area separation unit is configured to separate the area in which the lips of the user are located based on colors of multiple pixels forming the video that corresponds to the detected face area.

4. The device of claim 3, wherein the area detection unit is configured to detect the face area by separating pixels having colors included in a first color range, which is predetermined by associating colors with a skin color of a face, from the multiple pixels forming the video taken by the camera, and
   the area separation unit is configured to separate the area by separating pixels having colors included in a second color range, which is predetermined by associating colors with a lip color, from the multiple pixels forming the video that corresponds to the detected face area.

5. The device of claim 1, further comprising:
   a timestamp recording unit configured to record at least one timestamp, which is related to time synchronization between time when the face is captured by the camera and time when the voice is input through the microphone, at predetermined intervals, for video data composing the video taken by the camera and for voice data composing the voice input through the microphone, and wherein
   the video insertion unit is configured to insert the extracted lip shape that corresponds to the time when the recognized voice is input among video data composing the video taken by the camera, referring to the at least one timestamp.

6. A computer-implemented method for providing video and audio based communication by changing lip shapes of a communicator during a voice of the communicator is translated into a different language, the method comprising;
   storing and updating a plurality of first words of a first language and a plurality of second words correspondingly translated into a second language with respect to one of the first words, and video data associated with lip shapes corresponding to pronunciations of respective one of the second words translated into the second language, the video data comprising a plurality of lip shapes corresponding to pronunciation of each of the second words;
   detecting a face area of the communicator from a video taken by the camera and capturing a face of the communicator using a camera;
   determining, by a processor, an area corresponding to the lip shapes to separate the area apart from the detected face area;
   receiving a voice of the communicator through a microphone, and determining a word from the first words, the word being determined corresponding to the received voice;
   extracting a word from the second words, the extracted word being translated into the second language corresponding to the received voice, the extracted word being a word in the second language;
   determining and extracting, by the processor, a lip shape from the a plurality of lip shapes of video data, the extracted lip shape corresponding to a pronunciation of the extracted word; and
   inserting the extracted lip shape into the separated area at an interval based on timestamp during video and audio communications.

7. The method of claim 6, further comprising:
   outputting video and audio based communication signal by changing lip shapes of a communicator at an interval based on timestamp during a voice of the communicator is translated into a different language.

8. The method of claim 6, wherein the detection of the face area of the communicator from a video taken by the camera is performed based on determining colors of multiple pixels forming the video taken by the camera, and separating the area in which the lips of the user are located separates the area in which the lips of the user are located based on colors of multiple pixels forming the video that corresponds to the detected face area.

9. The method of claim 8, wherein the detecting the face area is performed by separating pixels having colors included in a first color range, which is predetermined by associating colors with a skin color of a face, from the multiple pixels forming the video taken by the camera, and separating the area by separating pixels having colors included in a second color range, which is predetermined by associating colors with a lip color, from the multiple pixels forming the video that corresponds to the detected face area.

10. The method of claim 6, further comprising:

recording at least one timestamp, which is related to time synchronization between time when the face is captured by the camera and time when the voice is input through the microphone, at predetermined intervals, for video data composing the video taken by the camera and for voice data composing the voice input through the microphone, and inserting the extracted lip shape that corresponds to the time when the recognized voice is input among video data composing the video taken by the camera, referring to the at least one timestamp.

* * * * *